US008065497B2

(12) United States Patent
Chu et al.

(10) Patent No.: US 8,065,497 B2
(45) Date of Patent: Nov. 22, 2011

(54) DATA MANAGEMENT METHOD, AND STORAGE APPARATUS AND CONTROLLER THEREOF

(75) Inventors: Chien-Hua Chu, Hsinchu County (TW); Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 559 days.

(21) Appl. No.: 12/259,026

(22) Filed: Oct. 27, 2008

(65) Prior Publication Data

US 2010/0030979 A1 Feb. 4, 2010

(30) Foreign Application Priority Data

Aug. 4, 2008 (TW) ................. 97129546 A

(51) Int. Cl.
*G06F 12/00* (2006.01)
*G06F 13/00* (2006.01)
*G06F 13/28* (2006.01)

(52) U.S. Cl. .................. 711/160; 711/103; 711/170

(58) Field of Classification Search .................. 711/103, 711/202, 160, 170
See application file for complete search history.

(56) References Cited

U.S. PATENT DOCUMENTS

| 7,206,893 | B2 * | 4/2007 | Gan et al. ................. 711/103 |
| 2003/0145141 | A1 * | 7/2003 | Chen et al. ................. 710/74 |
| 2009/0144488 | A1 * | 6/2009 | Chen ................. 711/103 |
| 2010/0153624 | A1 * | 6/2010 | Kuo ................. 711/103 |

* cited by examiner

*Primary Examiner* — Jared Rutz
*Assistant Examiner* — Ryan Bertram
(74) *Attorney, Agent, or Firm* — J.C. Patents

(57) ABSTRACT

A data management method, a controller and a storage apparatus thereof are provided. The method is adapted for a storage apparatus having a plurality of blocks. Parts of the blocks are linked to configure a plurality of mother and child blocks (M&C block). The data management method includes: (a) checking whether a mother and child block currently to be written with data is the same of a mother and child block which has been most lately written with data; (b) when it is determined that the mother and child block currently to be written with data is not the same of the mother and child block which has been most lately written with data, saving a transient data of the mother and child block currently to be written with data to a mother and child block transient relationship table.

19 Claims, 3 Drawing Sheets

DATA MANAGEMENT METHOD, AND STORAGE APPARATUS AND CONTROLLER THEREOF

CROSS-REFERENCE TO RELATED APPLICATION

This application claims the priority benefit of Taiwan application serial no. 97129546, filed Aug. 4, 2008. The entirety of the above-mentioned patent application is hereby incorporated by reference herein and made a part of this specification.

BACKGROUND

1. Technology Field

The present invention generally relates to a data management method, and a storage apparatus and a controller thereof, and more particularly, to a data management method adapted for a flash memory, and a storage apparatus and a controller thereof.

2. Description of Related Art

As the storage technology and semiconductor technology being fast developed, storage apparatuses having the advantages of large capacity, small size, and fast speed now become very popular in the market. Specifically, flash memories allow people to freely record data therein and transfer the data recorded therein to a computer connected thereto.

When a flash memory is in operation, a conventional controller for controlling the flash memory does not save all variable data about the flash memory whenever the conventional controller writes data in the flash memory. Otherwise, if the conventional controller saves the variable data whenever the conventional controller writes data in the flash memory, the conventional controller would be overloaded and spend too much time, which decreases the writing speed thereof. As such, such conventional controller records some tables for these variable data only when varying zones. That is, the flash memory is divided a plurality of zones, and the conventional controller only processes reading and writing for the same zone at the same time and save all variable data about the flash memory whenever the conventional controller writes data in other zone in the flash memory. The table, for example, is a logic-physical address mapping table. Generally, zone variations are not happened frequently. Therefore, the loss of time and decrease of access speed caused by recording the tables when varying zones are usually acceptable.

Further, in operation, for achieving a desired speed, the conventional controller will not always record the variable data when each instruction is issued. Specifically, all variable data are rebuilt by scanning and analyzing the inside blocks of the flash memory immediately after booting.

However, when an irregular power failure happens, it becomes difficult to rebuild the variable data. In this case, the conventional controller cannot determine whether the data stored therein are correct or not, and the data of different blocks often become unstable during the irregular power failure. The data of the blocks may be normal when booting, however, they usually become unstable when being accessed. As such, it raises difficulty to internal programs of the controller of the flash memory for determining, and indirectly affects the stability of the data stored therein.

SUMMARY

Accordingly, the present invention is directed to provide a data management method, a controller, and a storage apparatus thereof.

One principal aspect of the present invention provides a data management method, adapted for a storage apparatus having a plurality of blocks. Parts of the blocks are linked to configure a plurality of mother and child blocks (M&C blocks). The data management method includes: (a) checking whether a mother and child block currently to be written with data is the same of a mother and child block which has been most lately written with data; (b) when it is determined that the mother and child block currently to be written with data is not the same of the mother and child block which has been most lately written with data, saving a transient data of the mother and child block currently to be written with data to a mother and child block transient relationship table.

Another aspect of the present invention further provides a data management controller, adapted for a storage apparatus having a plurality of blocks. Parts of the blocks are linked to configure a plurality of mother and child blocks. The data management controller includes a microprocessor and a buffer. The microprocessor is coupled to the buffer. The buffer includes a program code. The microprocessor is adapted to read and execute the program code, and control the storage apparatus which is connected to the microprocessor to execute the steps of: (a) checking whether a mother and child block currently to be written with data is the same of a mother and child block which has been most lately written with data; (b) when it is determined that the mother and child block currently to be written with data is not the same of the mother and child block which has been most lately written with data, saving a transient data of the mother and child block currently to be written with data to a mother and child block transient relationship table.

Additional aspect of the present invention further provides a storage apparatus. The storage apparatus includes a storage block circuit, a system circuit, and a controller. The storage block circuit includes a plurality of blocks for storing data therein. Parts of the blocks are linked to configure a plurality of mother and child blocks. The system circuit is adapted for storing at least a mother and child block transient relationship table. The controller is coupled to the storage block circuit and the system circuit, for checking whether a mother and child block currently to be written with data is the same of a mother and child block which has been most lately written with data. When it is determined that the mother and child block currently to be written with data is not the same of the mother and child block which has been most lately written with data, a transient data of the mother and child block currently to be written with data is saved to the mother and child block transient relationship table.

Additional aspect of the present invention provides a method for improving a data stability and controller thereof, so as to allow a storage apparatus applying the method or employing the controller to achieve a better stability, thus avoiding the instability of data caused by irregular power failure. Further, the present invention saves the transient data about the mother and child block currently to be written with data to the mother and child block transient relationship table only when it is determined that the mother and child block currently to be written with data is not the same of the mother and child block which has been most lately written with data, the writing speed of the storage apparatus won't be remarkably affected.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EXEMPLARY EMBODIMENTS

Figure 1:
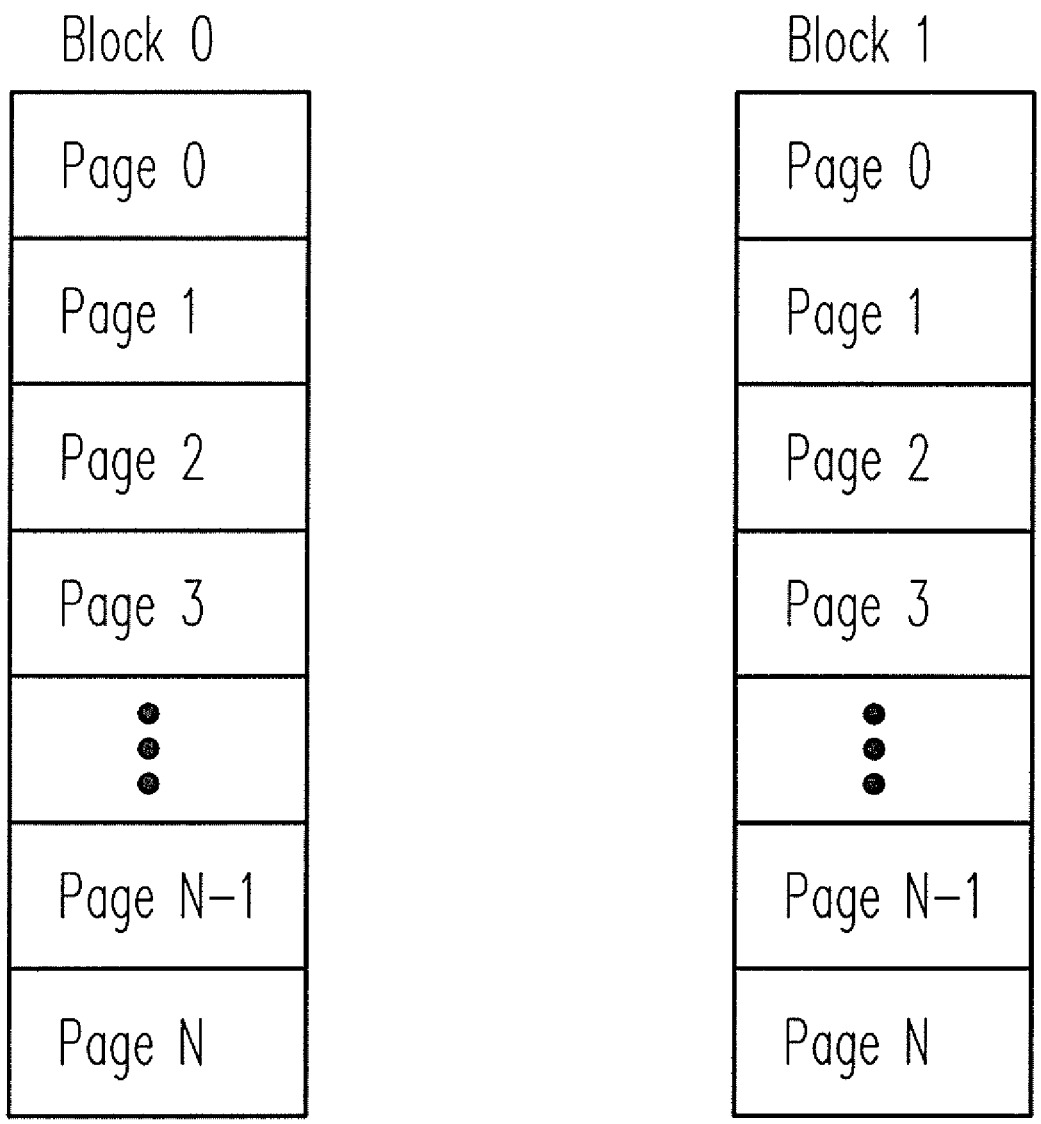
FIG. 1 is a schematic diagram illustrating a transient status of a flash memory of a storage apparatus when being accessed.

Reference will now be made in detail to the present preferred exemplary embodiments of the invention, examples of which are illustrated in the accompanying drawings. Wherever possible, the same reference numbers are used in the drawings and the description to refer to the same or like parts.

Prior to discussing the data management method and the storage apparatus and the controller thereof in details, the principle of accessing data in a flash storage apparatus is to be illustrated first. A flash memory of the flash storage apparatus typically includes a plurality of blocks for storing data therein. Each block includes a plurality of pages. Generally speaking, in the flash memory, data is erased in unit of blocks, and the data is written in unit of pages. When the flash storage apparatus is going to write data to a block containing data stored therein, the flash storage apparatus moves a part of data of the block containing data stored therein to another block having no data stored therein. In this case, the block originally containing data stored therein is defined as a mother block, and the block originally having no data stored therein and being linked with the mother block is defined as a child block of the mother block. Further, it should be classified that according to the present invention, because of the characteristic of the flash memory, the block having no data stored therein means that data stored in every normal cell of the block is 1. However, the block having no data stored therein is not restricted as such. Then, the storage apparatus of the flash memory writes the data which is to be written to a page corresponding to the child block, and moves the rest data of the mother block to the page corresponding to the child block. Then, the mother block is erased. And finally, a corresponding relationship thereof is updated in a logic-physical address mapping table. If, originally, a logic block number of the mother block is Logic 0, and an physical block number of the mother block is Block 0, while an physical block number of the child block is Block 1, then, before updating the logic-physical address mapping table, the logic block number Logic 0 is mapped to the physical block number Block 0, and after updating the logic-physical address mapping table, the logic block number Logic 0 is mapped to the physical block number Block 1. In other words, addresses of the blocks of the flash memory are not changed. Instead, the content of the logic-physical address mapping table is updated, so as to correctly map the logic addresses to the physical blocks, with which the data can be correctly read and written later.

However, the foregoing illustrated accessing method is only an exemplary embodiment of the present invention without limiting the scope of the present invention. More details of the accessing method of the flash memory can be learned by referring to U.S. patent application Ser. No. 12/047,144, and is not to be iterated hereby. When the mother block is not yet erased, and before combining the data of the mother block and the data of the child block, the transient relationship is recorded in a mother and child block transient relationship table. Combining the data of the mother block and the data of the child block means an operation of moving all of a plurality of effective data of the mother block to the child block, and eliminating a linking relationship between the mother block and the child block, and updating the logic-physical address mapping table. The mother and child block transient relationship table includes a logic address of the child block, a corresponding relationship between a updated page of the child block and the page of the mother block, a version of the updated data, erasing times of all physical blocks since the present booting operation, erasing times of the mother block, erasing times of the child block, a mapping data of each currently existed mother and child block, a logic address of the last one writing instruction or a mother and child block corresponding thereto or other related information which can be used for averaging a wear times of the physical blocks.

FIG. 1 is a schematic diagram illustrating a transient status of a flash memory of a storage apparatus (e.g. a flash storage apparatus) when being accessed. The exemplary embodiment of FIG. 1 depicts an accessing method different from the foregoing, while both of which do not restrict the scope of the present invention. Herein, it is assumed that it is recorded in the logic-physical address mapping table that the logic block address Logic 0 corresponds to the physical block Block 0, and the physical block Block 0 contains a plurality of effective data (e.g., pages Page 0 through Page N of the physical block Block 0) stored therein. When a logic address of the data to be written corresponds to the pages Page 2 and Page 3 of the physical block Block 0, a system control chip of the storage apparatus searches for a block having no data stored therein in the flash memory, which is usually a block in a spare area (e.g., spare physical block Block 1). Then, the spare physical block Block 1 and the physical block Block 0 are linked to configure a mother and child block. And then, the data is written therein. In other words, when there is data to be written to a physical block containing effective data stored therein, the storage apparatus will search for an empty block to be linked with the physical block to configure a group of mother and child block. In this case, the physical block Block 0 serves as a mother block Block 0, and the spare physical block Block 1 serves as a child block Block 1 corresponding to the mother block Block 0. Then, because the data contained in pages Page 0 and Page 1 of the mother block Block 0 are effective data, the data contained in pages Page 0 and Page 1 of the mother block Block 0 are moved to pages Page 0 and Page 1 of the child block Block 1.

Then, new data will be sequentially written to pages Page 2 and Page 3 of the child block Block 1. Before copying the data of pages Page 4 through Page N of the mother block Block 0 to pages Page 4 through Page N of the child block Block 1 (i.e., before closing the group of mother and child block), such a transient relationship can be recorded in a mother and child block transient relationship table. Because the data of pages Page 4 through Page N may probably be changed by later instructions, therefore if the transient relationship is saved in advance, and thereafter the mother and child block is closed when it is needed to be closed, unnecessary operations of moving and erasing the blocks can be avoided. Further, according to the logic-physical address mapping table and the mother and child block transient relationship table, when corresponding logic block addresses with physical block addresses, a plurality of physical block addresses may be corresponded to one logic block address. In other words, a combination of contents of the mother block Block 0 and the child block Block 1 is the content of the corresponding logic block.

In order to effectively managing the data of the flash memory, a best way is to record the inside variable data when each instruction is issued. Then, when the flash memory is rebooted, it can be determined that which block was being written when the power failure occurred, and only this block is needed to be processed. As such, it is a most robust data management method to record the logic address, a corresponding relationship between a updated page of the child block and the page of the mother block whenever an instruction is received, and a version of the updated data in the mother and child block transient relationship table. However, this method disadvantageously affects the accessing speed thereof a lot.

As such, according to the exemplary embodiment of the present invention, whenever there are different mother and child blocks to be written with data, logic addresses of the child blocks, corresponding relationships between updated pages of the child blocks and pages of the mother blocks, and versions of the updated data, and erasing times of all physical blocks since the present booting operation, erasing times of the mother blocks, erasing times of the child blocks, a mapping data of each currently existed mother and child block, a logic address of the last one writing instruction or a mother and child block corresponding thereto or other related information which can be used for averaging a wearing out times of the physical blocks are recorded in the mother and child block transient relationship table. However, if a next instruction is to instruct to write a data to a child block which has been most lately written with data, the logic address of the child block, the corresponding relationship between the updated page of the child block and the page of the mother block, and the version of the updated data, and erasing times of all physical blocks since the present booting operation, erasing times of the mother block, erasing times of the child block, a mapping data of each currently existed mother and child block, the logic address of the last one writing instruction or the mother and child block corresponding thereto or other related information which can be used for averaging a wearing out times of the physical blocks will not be recorded in the mother and child block transient relationship table. It is so because this indicates that the data to be written is either a continuing data continuous to the immediately previous data, or a data randomly corresponding to the same mother block. As such, in this case, the transient data of the mother and child block (including logic addresses of the child blocks, corresponding relationships between updated pages of the child blocks and pages of the mother blocks, and versions of the updated data, and erasing times of all physical blocks since the present booting operation, erasing times of the mother blocks, erasing times of the child blocks, a mapping data of each currently existed mother and child block, a logic address of the last one writing instruction or a mother and child block corresponding thereto or other related information which can be used for averaging a wearing out times of the physical blocks) are not needed to be recorded in the mother and child block transient relationship table. However, if a mother and child block which is going to be written with data by a next instruction is not the mother and child block which has been most lately written with data, the transient data should be recorded in the mother and child block transient relationship table. As such, whether to record the transient data to the mother and child block transient relationship table can be determined by determining whether the mother and child block which is currently to be written with data is the same of the mother and child block which has been most lately written with data, so as to effectively managing the data without seriously affecting the writing speed.

When the storage apparatus is booted again, or when a first time writing instruction after the booting operation is issued, the storage apparatus will forcedly close the mother and child block which has been written before the powering-off for effectively managing data. In other words, effective data of other pages of the mother block is moved to corresponding pages of the child block. Therefore, no matter the powering-off is irregular or not, the data management method, and the storage apparatus and the controller thereof according to the exemplary embodiment of the present invention are adapted for avoiding writing effective data into a block containing ineffective data saved therein, thus effectively managing the data.

According to an exemplary embodiment of the present invention, the storage apparatus saves a plurality of mother and child block transient relationship tales. The mother and child block transient relationship tales can be saved in, for example, a buffer circuit of the controller, a register memory, a specific block or a system circuit of the flash memory. According to an aspect of the exemplary embodiment, for the purpose of data protection or convenience of data recording, the latest mother and child block transient relationship data of the mother and child block transient relationship table can be instantly updated and temporarily stored in a register memory at first. After waiting for a specific time (e.g., 3 minutes), or when a specific instruction is received (e.g., flush instruction), or when a specific operation is operated (e.g., replacing a logic-physical address mapping table), the mother and child block transient relationship table containing the latest mother and child block transient relationship data is then copied from the register memory to the flash memory, or the mother and child block transient relationship table stored in the flash memory is then updated. The quantity of the mother and child block transient relationship tables which can be used for recording is not restricted by the present invention. The transient data of the mother and child blocks allows the storage apparatus to know which page of which block is being written with data before a powering-off when the storage apparatus is re-booted). Meanwhile, according to the transient data, data to be subsequently written can be rapidly written into the corresponding mother and child block. In another exemplary embodiment, the mother and child block transient relationship tables record information of a plurality of mother and child blocks related to the average wearing out times, such as erasing times of all physical blocks since the present booting operation, erasing times of the child block, erasing times of the mother block, a mapping data of each currently existed mother and child block, a logic address of at least the last one writing instruction, or a mother and child block corresponding thereto.

Figure 2:
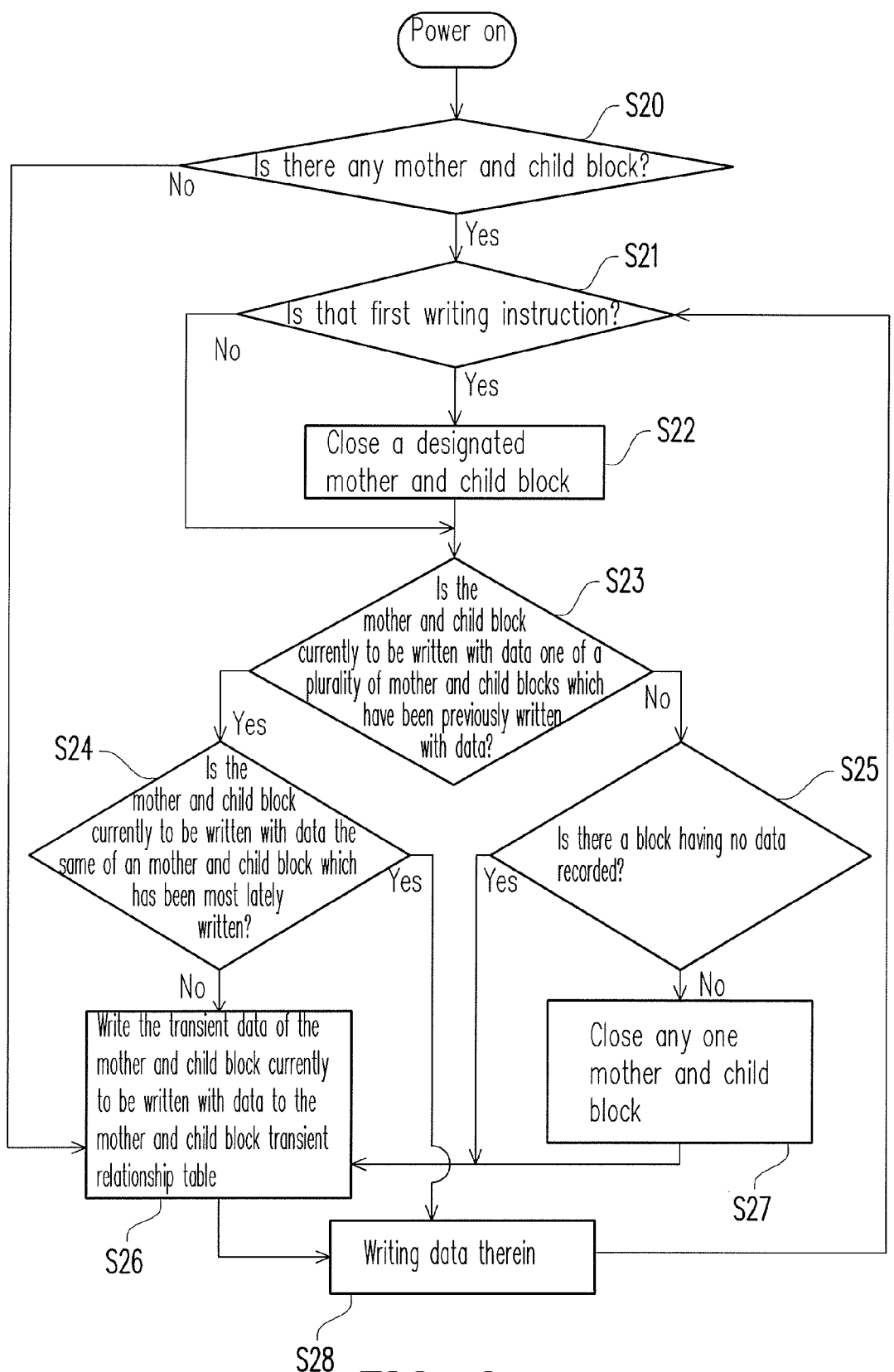
FIG. 2 is a flow chart illustrating a data management method for a storage apparatus of a flash memory according to an exemplary embodiment of the present invention.

FIG. 2 is a flow chart illustrating a data management method for a storage apparatus having a flash memory according to an exemplary embodiment of the present invention. Referring to FIG. 2, at first, the power source is turned on. Then at step S20, it is determined whether there is a mother and child block. If there is, then the flow goes to step S21, or otherwise there is not, the flow goes to step S26. Generally, if the flash memory is a new product never used before or just activated, most blocks of the storage apparatus of the flash memory have no data saved therein. In this case, the flow can go to step S26 directly.

At step S21, whether a received writing data is a first time writing data received after the power source is turned on is determined, in which at least one writing logic address recorded in the received writing instruction will be saved in or updated to the mother and child block transient relationship table. If the received writing data is the first time writing data received after the power source is turned on, the flow goes to step S22, or otherwise, the flow goes to step S23. At step S22, a designated mother and child block is closed, in which a data of a mother block of a mother and child block, which has been most lately written with data, before turning on the power source, is combined to a child block, and the logic-physical address mapping table is updated, and the corresponding mother and child block transient relationship table is eliminated or updated. Because a powering-off before turning on the power source may be an irregular power failure, therefore, the data most lately written to the mother and child block before the powering-off may be incorrect. As such, in order to avoid writing effective data into blocks having unstable data, and for the purpose of effectively managing data, step S22 closes the mother and child block which has been most lately written with data before the powering-off.

At step S23, it is determined that whether a mother and child block currently to be written with data is one of a plurality of mother and child blocks which have been previously written with data, according to the writing instructions saved in the mother and child block transient relationship table. If it is, then the flow goes to step S24, or otherwise the flow goes to step S25.

At step S25, it is inspected that whether there is a child block having no data saved therein which can be linked with a mother block of the current logic writing address to configure a mother and child block. If there is, then the flow goes to step S26, or otherwise the flow goes to Step S27 to close one of a plurality of mother and child blocks to create one child block having no data saved therein, and eliminate or update the mother and child block transient relationship table of the closed mother and child block. In such a way, the child block having no data saved therein can be corresponded to the mother block of the current logic writing address to configure the mother and child block currently to be written with data, for further performing step S26.

At step S24, it is determined whether a mother and child block currently to be written with data is the same of a mother and child block which has been most lately written with data. If it is, then the flow goes to execute step S28, or otherwise, the flow goes to directly executes step S26. At step S26, the transient data of the mother and child block currently to be written with data is saved to the mother and child block transient relationship table. At step S28, the data to be written is written in the child block of the mother and child block. Then, the flow goes back to step S21.

It can be learnt from the foregoing illustrated flow, when turning on a power source, the data management method of the exemplary embodiments of the present invention closes a mother and child block which has been most lately written with data before a previous powering-off of the power source, so as to prevent writing effective data into a block containing ineffective data saved therein, thus effectively managing the data. A further exemplary embodiment is to be given below for illustrating the operation of the foregoing method, for providing better understanding about the present invention to those having ordinary skill in the art.

Herein, it is assumed that the mother and child block currently to be written with data is M&C1. After the power source is turned on, whether there is a mother and child block and whether it is the first time writing instruction are sequentially determined according to a mother and child block transient relationship table saved in the flash memory. If there is a mother and child block and it is the first time writing instruction, the mother and child block which has been most lately written before the power source is turned on, and then it is checked whether the mother and child block currently to be written with data is one of a plurality of mother and child blocks which have been previously written with data. If the mother and child block currently to be written with data is not one of a plurality of mother and child blocks which have been previously written with data, the transient data of the mother and child block currently to be written with data is directly saved, and the data is written to the mother and child block. Or otherwise, if it is not the first time instruction, then whether the mother and child block currently to be written with data is one of a plurality of mother and child blocks which have been previously written with data is directly checked.

If the mother and child block currently to be written with data M&C1 is one of a plurality of mother and child blocks which have been previously written with data, (i.e., the transient data of the mother and child block currently to be written with data is recorded in the mother and child block transient relationship table), and the mother and child block currently to be written with data M&C1 is the same of the mother and child block which has been most lately written with data, then the data will be continuously written to the mother and child block M&C1. If the mother and child block currently to be written with data M&C1 is one of a plurality of mother and child blocks which have been previously written with data, and the mother and child block currently to be written with data M&C1 is the different from a mother and child block which has been most lately written with data M&C2, then the transient data of the data will be continuously written to the mother and child block M&C1 is recorded, and transient data related to the mother and child block currently to be written with data M&C1 previously recorded in the mother and child block transient relationship table is updated by the present transient data. Because the mother and child block currently to be written with data M&C1 is different from the mother and child block which has been most lately written with data M&C2, the data will be written to the mother and child block currently to be written with data M&C1. Further, when another writing instruction is received next time, it can be learnt that the mother and child block which has been previously written with data is M&C1 according to the updated mother and child block transient relationship table.

If the mother and child block currently to be written with data M&C1 is not one of a plurality of mother and child blocks which have been previously written with data, then it is inspected that whether there is a child block having no data saved therein which can be linked with the mother block of the current logic writing address to configure the mother and child block currently to be written with data. If there is, then the transient data of the mother and child block currently to be written with data M&C1 is saved to the mother and child block transient relationship table. If there is no a empty child block, then any one mother and child block will be closed, and the mother and child block transient relationship table of the closed mother and child block will be eliminated, so as to obtain an empty child block to link with the mother block of the logic writing address of the data currently to be written to configure a mother and child block currently to be written. And then the transient data of the mother and child block currently to be written with data M&C1 is saved, and the data is written to the mother and child block M&C1.

Figure 3:
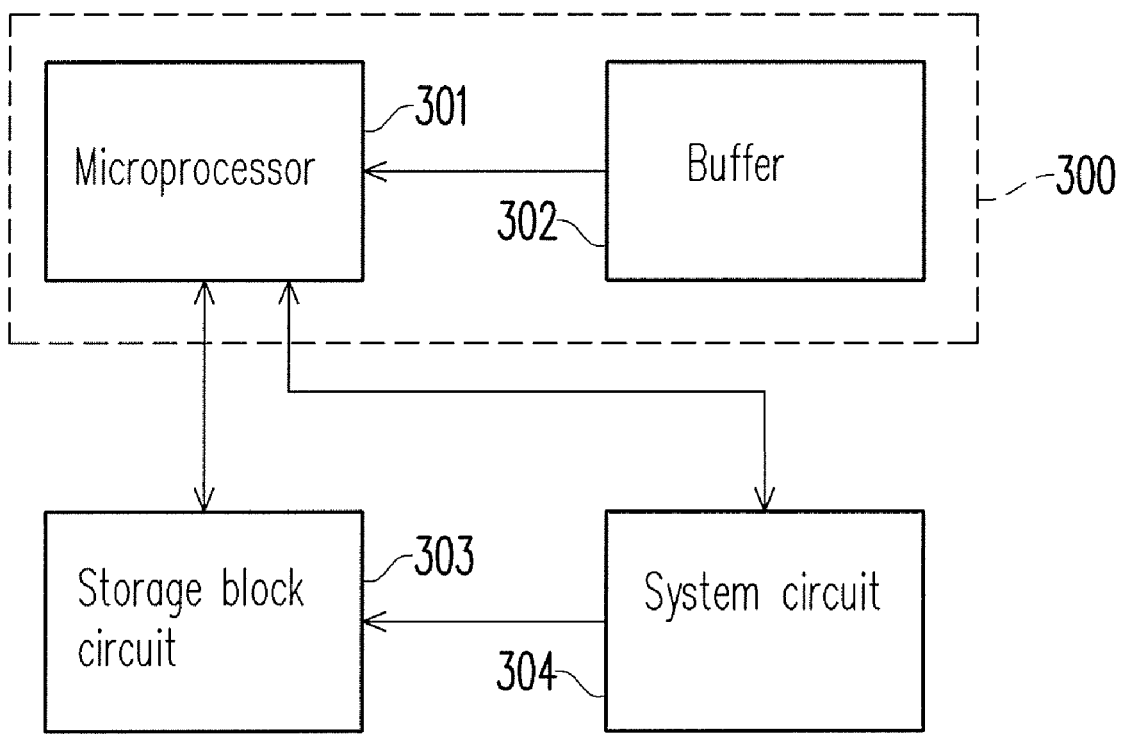
FIG. 3 is a system block diagram illustrating a storage apparatus and a controller of the storage apparatus according to an exemplary embodiment of the present invention.

FIG. 3 is a system block diagram illustrating a storage apparatus 30 and a controller 300 of the storage apparatus 30 according to an exemplary embodiment of the present invention. Referring to FIG. 3, the storage apparatus 30 includes a controller 300, a storage block circuit 303, and a system circuit 304. The controller 300 includes a microprocessor 301 and a buffer 302. The buffer 302 is coupled with the microprocessor 301. The microprocessor 301 is coupled with the storage block circuit 303 and the system circuit 304. According to an aspect of the exemplary embodiment, the controller 300 and the system circuit 304 are separately provided. According to another aspect of the exemplary embodiment, the controller 300 is designed inside the system circuit 304. In other words, the configuration relationship between the controller 300 and the system circuit 304 is not a limitation restricting the scope of the present invention.

The storage block circuit 303 includes a plurality of storage blocks of a flash memory. As mentioned above, the storage blocks include a plurality of pages. Further, the system circuit 304 is adapted for saving the foregoing mother and child block transient relationship table. The system circuit 304, for example, can be a random access memory (RAM), or a non-volatile memory, or other kinds of memory units. The mother and child block transient relationship table records a logic address of the child block, a corresponding relationship between a updated page of the child block and the page of the mother block, a version of the updated data, erasing times of all physical blocks since the present booting operation, erasing times of the mother block, erasing times of the child block, a mapping data of each currently existed mother and child block, a logic address of the last one writing instruction or a mother and child block corresponding thereto or other related information which can be used for averaging a wearing out times of the physical blocks. The buffer 302 stores a program code, and the microprocessor 301 is adapted for reading the program code stored in the buffer 302. The program code is originally stored in the storage block circuit 303, and when the power source is turned on, the controller 300 controls the storage block circuit 303 to transmit the program code stored therein to the buffer 302 for storing therein. The microprocessor 301 then executes the program code of the buffer 302, to control the storage block circuit 303 and the system circuit 304 for performing the method as shown in FIG. 2.

The mother and child block transient relationship is saved in the system circuit 304, but however it should be noted that for the purpose of data protection or convenience of data recording, after waiting for a specific time (e.g., 3 minutes), or when receiving a specific instruction (e.g., flush instruction), or when executing a specific operation (e.g., replacing the logic-physical address mapping table), the controller 300 will copy the mother and child block transient relationship table from the system circuit 304 to the storage block circuit 303. Further, the storage apparatus 30 can be a storage apparatus of a pen drive, or a storage apparatus of a solid state disk (SSD). The storage block circuit 303 can be a non-volatile memory, such as N and flash memory.

In summary, the data management method and the controller thereof according to the exemplary embodiment of the present invention allow a storage apparatus applying the method or using the controller to effectively manage data. Further, the present invention saves the transient data about the mother and child block currently to be written with data to the mother and child block transient relationship table only when it is determined that the mother and child block currently to be written with data is not the same of the mother and child block which has been most lately written with data, the writing speed of the storage apparatus won't be remarkably affected.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data management method, adapted for a storage apparatus having a plurality of blocks, wherein parts of the blocks are linked to configure a plurality of mother and child blocks, the data management method comprising:

checking whether a mother and child block currently to be written with data is the same of a mother and child block which has been most lately written with data;

saving a transient data of the mother and child block currently to be written with data to a mother and child block transient relationship table when it is determined that the mother and child block currently to be written with data is not the same of the mother and child block which has been most lately written with data, wherein the mother and child block transient relationship table marks the mother and child block which has been most lately written with data among the plurality of mother and child blocks.

2. The data management method according to claim 1, wherein the transient data of the mother and child block currently to be written with data comprises a logic address of the child block, a corresponding relationship between a updated page of the child block and a page of the mother block, a version of a updated data, erasing times of all physical blocks since a present booting operation, erasing times of the mother block, erasing times of the child block, a mapping data of each currently existed mother and child block, a logic address of a last one writing instruction or a mother and child block corresponding thereto or at least another related information which can be used for averaging a wearing out times of the physical blocks of the storage apparatus.

3. The data management method according to claim 1, further comprising:

checking whether the mother and child block currently to be written with data is one of a plurality of mother and child blocks which have been previously written with data;

checking whether there is a block having no data saved therein which can be linked with a block currently to be written with data to configure a mother and child block; and closing any one of the mother and child blocks which have been previously written with data, when there is no a block having no data saved therein.

4. The data management method according to claim 1, further comprising:

determining whether a received writing instruction is a first time received writing instruction since the turning on the power source; and closing the mother and child block which has been most lately written with data, when the received writing instruction is the first time received writing instruction since the turning on the power source.

5. The data management method according to claim 1, further comprising:

writing the data to be currently written to the mother and child block currently to be written, when the mother and child block currently to be written with data is the same of a mother and child block which was most lately written with data.

6. A data management controller, adapted for a storage apparatus having a plurality of blocks, wherein parts of the blocks are linked to configure a plurality of mother and child blocks, the data management controller comprising:

a microprocessor, and a buffer, the microprocessor being coupled to the buffer, wherein the buffer comprises a program code, the microprocessor is adapted to read and execute the program code, and control the storage apparatus which is connected to the microprocessor to execute the following steps of:

checking whether a mother and child block currently to be written with data is the same of a mother and child block which has been most lately written with data;

saving a transient data of the mother and child block currently to be written with data to a mother and child block transient relationship table, when it is determined that the mother and child block currently to be written with data is not the same of the mother and child block which has been most lately written with data, wherein the mother and child block transient relationship table marks the mother and child block which has been most lately written with data among the plurality of mother and child blocks.

7. The data management controller according to claim 6, wherein the transient data of the mother and child block currently to be written with data comprises a logic address of the child block, a corresponding relationship between a updated page of the child block and a page of the mother block, a version of a updated data, erasing times of all physical blocks since a present booting operation, erasing times of the mother block, erasing times of the child block, a mapping data of each currently existed mother and child block, a logic address of a last one writing instruction or a mother and child block corresponding thereto or at least another related information which can be used for averaging a wearing out times of the physical blocks of the storage apparatus.

8. The data management controller according to claim 6, wherein the processor further controls the storage apparatus to execute the following steps of:

checking whether the mother and child block currently to be written with data is one of a plurality of mother and child blocks which have been previously written with data;

checking whether there is a block having no data saved therein which can be linked with a block currently to be written with data to configure a mother and child block; and closing any one of the mother and child blocks which have been previously written with data, when there is no a block having no data saved therein.

9. The data management controller according to claim 6, wherein the processor further controls the storage apparatus to execute the following steps of:

determining whether a received writing instruction is a first time received writing instruction since the turning on the power source; and closing the mother and child block which has been most lately written with data, when the received writing instruction is the first time received writing instruction since the turning on the power source.

10. The data management controller according to claim 6, wherein the processor further controls the storage apparatus to execute the following steps of:

writing the data to be currently written to the mother and child block currently to be written, when the mother and child block currently to be written with data is the same of the mother and child block which has been most lately written with data.

11. The data management controller according to claim 6, wherein the storage apparatus is a flash storage apparatus.

12. The data management controller according to claim 6, wherein the mother and child block transient relationship table is saved in a system circuit of the data management controller.

13. A storage apparatus, comprising:

a storage block circuit, comprising a plurality of blocks for storing data therein, wherein parts of the blocks are linked to configure a plurality of mother and child blocks, a system circuit, for storing at least a mother and child block transient relationship table; and a controller, coupled to the storage block circuit and the system circuit, for checking whether a mother and child block currently to be written with data is the same of a mother and child block which has been most lately written with data, wherein when it is determined that the mother and child block currently to be written with data is not the same of the mother and child block which has been most lately written with data, a transient data of the mother and child block currently to be written with data is saved to the mother and child block transient relationship table, wherein the mother and child block transient relationship table marks the mother and child block which has been most lately written with data among the plurality of mother and child blocks.

14. The storage apparatus according to claim 13, wherein the transient data of the mother and child block currently to be written with data comprises a logic address of the child block, a corresponding relationship between a updated page of the child block and a page of the mother block, a version of a updated data, erasing times of all physical blocks since a present booting operation, erasing times of the mother block, erasing times of the child block, a mapping data of each currently existed mother and child block, a logic address of a last one writing instruction or a mother and child block corresponding thereto or at least another related information which can be used for averaging a wearing out times of the physical blocks of the storage apparatus.

15. The storage apparatus according to claim 13, wherein the controller is further adapted for checking whether the mother and child block currently to be written with data is one of a plurality of mother and child blocks which have been previously written with data, checking whether there is a block having no data saved therein which can be linked with a block currently to be written with data to configure a mother and child block, and closing any one of the mother and child blocks which have been previously written with data.

16. The storage apparatus according to claim 13, wherein the controller is further adapted for determining whether a received writing instruction is a first time received writing instruction since the turning on the power source, and closing the mother and child block which has been most lately written with data, when the received writing instruction is the first time received writing instruction since the turning on the power source.

17. The storage apparatus according to claim 13, wherein the controller is further adapted for writing the data to be currently written to the mother and child block currently to be written, when the mother and child block currently to be written with data is the same of the mother and child block which has been most lately written with data.

18. The storage apparatus according to claim 13, wherein the storage block circuit is a NAND flash memory.

19. The storage apparatus according to claim 13, wherein the controller is further adapted for copying the mother and child block transient relationship table saved in the system circuit for saving the mother and child block transient relationship table to the storage block circuit.

* * * * *